United States Patent
Bellenger et al.

(10) Patent No.: US 11,481,757 B2
(45) Date of Patent: Oct. 25, 2022

(54) WIRELESS SHORT RANGE COMMUNICATION LINK TRANSMISSION OF LINE ITEM DATA IN REAL TIME

(71) Applicant: Visa International Service Association, San Francisco, CA (US)

(72) Inventors: Thomas Bellenger, San Mateo, CA (US); Paul Van Oppen, San Francisco, CA (US); Chunxi Jiang, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/997,337

(22) Filed: Aug. 19, 2020

(65) Prior Publication Data

US 2020/0380491 A1    Dec. 3, 2020

Related U.S. Application Data

(63) Continuation of application No. 14/970,395, filed on Dec. 15, 2015, now Pat. No. 10,789,587.

(51) Int. Cl.
*G06Q 20/32* (2012.01)
*G06Q 20/34* (2012.01)

(52) U.S. Cl.
CPC ......... *G06Q 20/327* (2013.01); *G06Q 20/322* (2013.01); *G06Q 20/352* (2013.01)

(58) Field of Classification Search
None
See application file for complete search history.

(56) References Cited

U.S. PATENT DOCUMENTS

| | | |
|---|---|---|
| 8,219,490 B2 | 7/2012 | Hammad et al. |
| 8,577,731 B1 | 11/2013 | Cope et al. |
| 8,579,203 B1 | 11/2013 | Lambeth et al. |

(Continued)

OTHER PUBLICATIONS

U.S. Appl. No. 14/970,395, Final Office Action, dated Sep. 10, 2018, 12 pages.

(Continued)

*Primary Examiner* — Scott S Trotter
*Assistant Examiner* — Amit Patel
(74) *Attorney, Agent, or Firm* — Kilpatrick Townsend & Stockton LLP

(57) ABSTRACT

Methods for wireless payments using the Bluetooth low energy (BLE) protocol are provided. A first method includes establishing a wireless-short range communication link from a communication device to a peripheral device associated with an access device. The communication device receives item level data associated with an item being processed by the access device. The communication device displays the item level data associated with the item and transmits payment data to the access device. A second method includes establishing wireless-short range communication link to from a peripheral device associated with an access device to a communication device. The peripheral device transmits item level data associated with an item being processed by the access device, wherein the communication device displays the item level data associated with the item and receives payment data from the communication device.

20 Claims, 7 Drawing Sheets

(56) References Cited

U.S. PATENT DOCUMENTS

| | | | |
|---|---|---|---|
| 9,010,644 B1 | 4/2015 | Workley | |
| 9,990,621 B1* | 6/2018 | Ng | G06Q 20/202 |
| 2003/0061157 A1 | 3/2003 | Hirka et al. | |
| 2008/0040285 A1 | 2/2008 | Wankmueller | |
| 2009/0159663 A1 | 6/2009 | Mullen et al. | |
| 2009/0192904 A1 | 7/2009 | Patterson et al. | |
| 2010/0057619 A1 | 3/2010 | Weller et al. | |
| 2011/0131128 A1 | 6/2011 | Vaeaenaenen | |
| 2011/0231270 A1 | 9/2011 | Dykes et al. | |
| 2011/0270759 A1 | 11/2011 | Peart et al. | |
| 2011/0313840 A1 | 12/2011 | Mason et al. | |
| 2012/0059718 A1 | 3/2012 | Ramer et al. | |
| 2012/0074232 A1 | 3/2012 | Spodak et al. | |
| 2012/0310760 A1 | 12/2012 | Phillips et al. | |
| 2013/0134962 A1 | 5/2013 | Kamel et al. | |
| 2013/0228616 A1 | 9/2013 | Bhosle et al. | |
| 2015/0058146 A1 | 2/2015 | Gaddam et al. | |
| 2015/0127553 A1 | 5/2015 | Sundaram et al. | |
| 2015/0248664 A1 | 9/2015 | Makhdumi et al. | |
| 2017/0169418 A1 | 6/2017 | Bellenger et al. | |

OTHER PUBLICATIONS

U.S. Appl. No. 14/970,395, Final Office Action, dated Dec. 12, 2019, 8 pages.
U.S. Appl. No. 14/970,395, Non-Final Office Action, dated Jan. 12, 2018, 10 pages.
U.S. Appl. No. 14/970,395, Non-Final Office Action, dated Apr. 19, 2019, 9 pages.
U.S. Appl. No. 14/970,395, Notice of Allowance, dated May 20, 2020, 11 pages.
Meola, "Mobile Payments Technology and Contactless Payments Explained", Available online at:http://www.businessinsider.com/mobile-payment-technology-contactless-paymentsexplained-2016-11, Dec. 21, 2016, 6 pages.

* cited by examiner

WIRELESS SHORT RANGE COMMUNICATION LINK TRANSMISSION OF LINE ITEM DATA IN REAL TIME

This application is a continuation of Ser. No. 14/970,395, filed Dec. 15, 2015 of which is herein incorporated by reference in their entirety.

BACKGROUND

The use of in-store wireless transactions (e.g., via a personal communication device) has become increasingly popular. A user is not required to take out his/her wallet to swipe a physical card, and the transaction receipt can be displayed directly on the user's communication device. One popular wireless protocol used for in-store wireless transactions is Near Field Communication (NFC). However, NFC requires very close proximity (e.g., a few inches) between the user's communication device and an access device. As a result, the user may be required to hold the communication device close to the access device for a significant period of time. Further, the NFC connection is only open for a short period of time, preventing line item data associated with the transaction from being displayed on the communication device in real-time.

Embodiments of the invention address these and other problems.

BRIEF SUMMARY

In some embodiments of the invention, systems and methods for wireless payments using the Bluetooth low energy (BLE) protocol are provided. The BLE protocol may allow for a short-range wireless connection between a communication device and access device to remain open longer than other proximity technologies, such as NFC or Quick Response (QR) codes. This may be because BLE has a greater connection range than other proximity technologies, alleviating the need to continually hold the communication device to a reader (e.g., access device). For example, a Bluetooth or Bluetooth Low Energy (BLE) enabled device may have an extended range of ten to hundreds of feet or greater as compared to a range of less than a few inches for NFC. Further embodiments of the invention allow for transmission of line item (e.g., level III) data in real-time from the access device to the communication device, essentially occurring as items are "scanned" at the access device and transmitted back to the communication device in real-time over the open BLE connection. This may allow for a user to view the itemized details of a transaction on his/her communication device prior to completing the transaction.

Some embodiments of the invention are directed to a method for facilitating a transaction. The method may include establishing, via a communication device, a wireless-short range communication link to a peripheral device associated with an access device. The method may also include receiving, by the communication device and from the peripheral device, item level data associated with an item being processed by the access device. The method may further include displaying, on display on the communication device, the item level data associated with the item. The method may additionally include in response to a user action, transmitting, by the communication device, payment data to the access device.

In some embodiments, the wireless-short range communication link is a Bluetooth low energy (BLE) communication link.

In some embodiments, the peripheral device is a BLE enabled device.

In some embodiments, the access device processes the transaction based at least in part on the payment transmitted payment data.

In some embodiments, the method may also include receiving, by the communication device and from the peripheral device, item level data associated with a second item being processed by the access device and displaying, on the display, the item level data associated with the second item.

Some embodiments of the invention are directed to another method for facilitating a transaction. The method may include establishing, via a peripheral device associated with an access device, a wireless-short range communication link to a communication device. The method may also include transmitting, by the peripheral device and to the communication device, item level data associated with an item being processed by the access device, wherein the communication device displays the item level data associated with the item. The method may additionally include in response to a user action, receiving, by the peripheral device, payment data from the communication device.

In some embodiments, the wireless-short range communication link is a Bluetooth low energy (BLE) communication link.

In some embodiments, the peripheral device is a BLE enabled device.

In some embodiments, the access device processes the transaction based at least in part on the payment transmitted payment data.

In some embodiments, the method may also include transmitting, via the peripheral device and to the communication device, item level data associated with a second item being processed by the access device, wherein the communication device displays the item level data associated with the second item.

Other embodiments of the invention are directed to servers and systems that are configured to perform the above-described methods.

These and other embodiments of the invention are described in further detail below.

DETAILED DESCRIPTION

Figure 1:
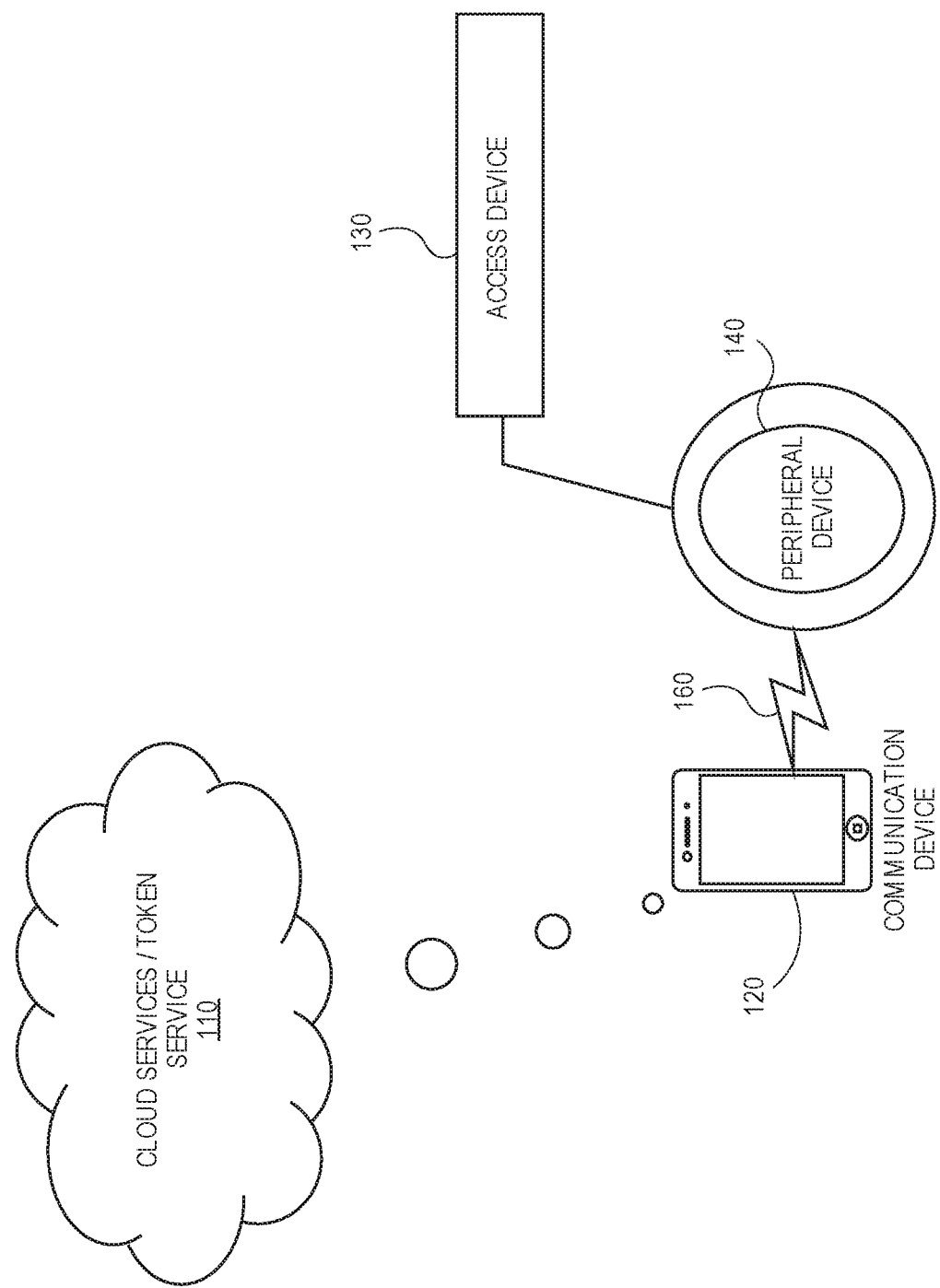
FIG. 1 shows a block diagram of a communication device in wireless communication with a peripheral device associated with an access device, in accordance with some embodiments of the invention.

Prior to discussing embodiments of the invention, descriptions of some terms may be helpful in understanding embodiments of the invention.

A "payment device" may include any suitable device capable of making a payment. For example, a payment device can include a card including a credit card, debit card, charge card, gift card, or any combination thereof. A payment device can be used in conjunction with a consumer device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" may be an electronic message that is sent to an authorization system such as a payment processing network and/or an issuer computer to request authorization for a transaction. An authorization request message is an example of a transaction message. An authorization request message according to some embodiments may comply with ISO 8583, which is a standard for systems that exchange electronic transaction information associated with a payment made by a consumer using a payment device or a payment account. The authorization request message may comprise a primary account number (PAN), expiration date, service code, CVV and other data from a payment device. In some embodiments of the invention, an authorization request message may include a payment token (e.g., a substitute or pseudo account number), an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements including, by way of example only: a service code, a CVV (card verification value), a dCVV (dynamic card verification value), an expiration date, etc.

An "authorization response message" may be an electronic message reply to an authorization request message generated by the authorization system. The authorization response message may include an authorization code, which may be a code that the authorization system returns in response to receiving an authorization request message (either directly or through the payment processing network). The authorization response message is received at the merchant's access device (e.g. POS terminal) and can indicate approval or disapproval of the transaction by the authorization system.

An "access device" can include a device that allows for communication with a remote computer, and can include a device that enables a customer makes a payment to a merchant in exchange for goods or services. An access device can include hardware, software, or a combination thereof. Examples of access devices include point-of-sale (POS) terminals, mobile phones, tablet computers, laptop or desktop computers, etc.

A "resource providing entity" can be any entity that provides resources during a transaction. For example, a resource providing entity can be a merchant, a venue operator, a building owner, a governmental entity, etc.

A "wireless short range communication link" may include a communication link between two physical devices that does not utilize wires. Wireless short range communication links may utilize any suitable wireless communication technology including Bluetooth, Bluetooth Low Energy (BLE), Wi-Fi, Zig Bee, ultrasonic, a mixture of the aforementioned technologies, or other suitable protocols. The range of a short range communication link may generally be less than 100 feet.

"Bluetooth low energy" (BLE) is a wireless personal area network technology designed and marketed by the Bluetooth Special Interest Group. Compared to Classic Bluetooth, BLE is intended to provide considerably reduced power consumption and cost while maintaining a similar communication range. A connection between two or more devices using BLE may be referred to as a BLE wireless connection.

A "peripheral device" is any device defined as any auxiliary device such as that connects to and works with a computer in some way. A peripheral device according to embodiments of the invention may include devices that can establish wireless short range communication links and may use any of the above-noted wireless communication technologies.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

FIG. 1 shows a block diagram of a communication device 120 in wireless communication with a peripheral device 140 associated with an access device 130, in accordance with some embodiments of the invention. The access device 130 may be communicatively coupled to the peripheral device 140 through a wired or wireless connection. The access device 130 may be associated with a resource providing entity (e.g., a merchant) and present at a checkout area within a merchant store, for example. In some embodiments, the peripheral device 140 may be a BLE-enabled peripheral device configured to provide BLE wireless capability to the access device 130. In some embodiments, the access device 130 may already have built-in BLE functionality and the peripheral device 140 may be incorporated into the access device 130.

The communication device 120 may a smartphone, tablet, mobile computer, or any other device capable of transmitting data to the peripheral device 140. The communication device 120 may include software to facilitate a payment transaction, such as a digital wallet application. Further, the communication device 120 may include a Secure Element (SE) to securely store payment credentials associated with the user. Further, the communication device 120 may communicate, prior to a transaction, with a cloud service or a token service 110 in order to obtain payment data associated with the user. The cloud service or token service 110 may be associated with an issuer of the payment card associated with the user. The cloud service or token service 110 may be operated by one or more remotely located server computers. Further, the communication device 120 may communicate with the peripheral device 140 over BLE wireless link 160 (or other short range wireless communication link). The communication device 120 may have BLE functionality built-in to the device itself.

In some implementations, the communication device 120 may be the central device and may function as the host in the BLE connection between the communication device 120 and the peripheral device 140. In some implementations, the communication device 120 may be a tethered device. The communication device may also be referred to as a consumer device.

At the time of a transaction, a user may approach the access device 130 located within, for example, a merchant store. The user may then initiate the transaction by interacting with his/her communication device 120 (e.g., by opening a digital wallet application or other payment application). The communication device 120 may then initiate a BLE wireless connection with the peripheral device 140 associated with the access device 130. The wireless connection between the communication device 120 and the peripheral device 140 may be both secure and encrypted. In some embodiments, the peripheral device 140 may be continuously advertising its presence so that the communication device 120 can "scan" and discover available peripheral devices 140 within BLE range that may be suitable to establish a connection with. In some implementations, the communication device 120 may prompt the user to select from the peripheral devices 140 discovered by the communication device 120

In some implementations, the peripheral device 140 may host the Generic Attribute Profile (GATT) database, which is part of the Bluetooth specification.

After the BLE wireless connection has been established via the communication device 120 and the peripheral device 140, the communication device 120 may display line item data for each item that is scanned at the access device 130. For example, when a carton of milk is scanned at the access device 130, the access device 130 may transmit (via peripheral device 140) the line item data (e.g., item information, quantity, price, tax information, etc.) to the communication device 120 via the BLE wireless connection. In turn, the communication device 120 may display the line item data in real-time to the user. Similarly, each subsequent item that is scanned may also be displayed on the communication device 120.

After all the desired items are scanned at the access device 130, the user may be able to view line item data for all the items on the communication device 120 and elect to complete the transaction using the communication device 120. The communication device 120 may transmit payment information to the access device 130 (via peripheral device 140) in order for the transaction to be authorized. Upon successful authorization of the transaction, the access device 130 may transmit (via peripheral device 140) a receipt for the transaction to the communication device 120. The receipt may be displayed by the communication device 120. Further details relating to the data transmitted over the BLE wireless connection are provided below.

Figure 2:
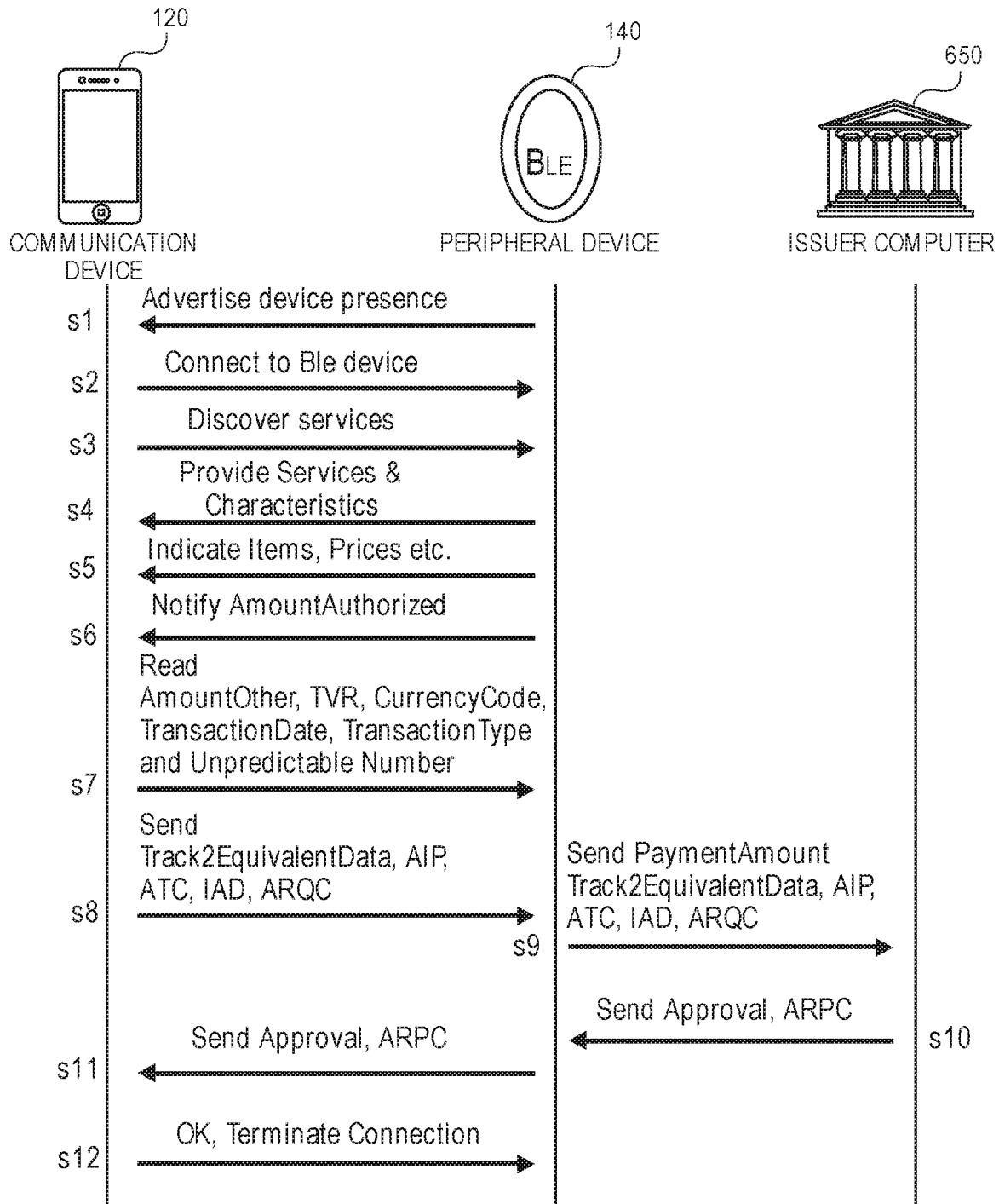
FIG. 2 is a diagram illustrating the connection flow between a communication device and a BLE device, in accordance with some embodiments of the invention.

FIG. 2 is a diagram illustrating a data flow between a communication device 120 and a BLE peripheral device 140, and an issuer computer 640 in accordance with some embodiments of the invention.

At step s1, the peripheral device 140 (e.g., BLE equipped peripheral device) may "advertise" its presence by broadcasting a signal over a BLE channel. By advertising its presence, the peripheral device 140 may indicate that is ready to accept a BLE wireless connection from a communication device 120 in order to conduct a transaction at an access device 130 to which the peripheral device 140 is connected. The peripheral device 140 may advertise its presence by broadcasting the signal continuously or at predefined intervals (e.g., every 10 seconds).

At step s2, after the peripheral device 140 advertises its presence, the communication device 120 may connect to the peripheral device 140. In some embodiments, the communication device 120 may "scan" one or more BLE channels to discover which peripheral devices 140 are advertising their presence. Upon discovering one or more peripheral devices 140, the communication device 120 may present a list of discovered peripheral devices 140 to the user. The user may select the appropriate peripheral device 140 that is associated with the access device 130 the user wishes to initiate the transaction with. In establishing the BLE connection with the peripheral device 140, the communication device 120 may initiate a pairing procedure. The pairing procedure may include, but is not limited to, exchange of pairing information, authentication of the link, and distribution of keys.

At step s3, after establishing the BLE connection with the peripheral device 140, the communication device 120 may discover the available services on the peripheral device 140. For example, the communication device 120 may use Bluetooth Service Discovery Protocol (SDP) to discover which services the peripheral device 140 supports. Upon determining which services the peripheral device 140 supports, the communication device 120 may elect which services to use for the BLE wireless connection. Accordingly, in step s4, the peripheral device 140 may provide the elected services and characteristics to the communication device 120.

At step s5, one or more items associated with the transaction may be scanned at the access device 130. In this regard, the access device 130 may include a scanner such as a bar code scanner which can scan one or more items for purchase. Upon scanning each item at the access device 130, the peripheral device 140 may transmit lime item data for each item to the communication device 120, over the BLE wireless connection. Line item data may include, for example, item name, quantity, price, tax information, etc. Upon receiving the line item data from the peripheral device 140, the communication device 120 may display the line item data to the user, such that the user can view in real-time the line item data for each item as it is scanned at the access device 130.

At step s6, after the line item data for each item scanned is sent to the communication device 120 in real-time by the access device 130, the amount authorized may be sent from the access device 130 to the peripheral device 140, and then to the communication device 120. The amount authorized may indicate the total amount for the transaction that after all the items have been scanned by the access device 130. In some embodiments of the invention, the peripheral device 140 may otherwise send a signal to the communication device 120 that the item scanning process is otherwise complete. In this regard, the total amount of the transaction could be sent from the peripheral device 140 to the communication device 120. In either case, the signal may indicate that the access device 130 is now ready to receive payment data from the communication device 120.

At step s7, the communication device 120 may read various transaction related data from the peripheral device 140, over the wireless BLE connection. The transaction related data can include, but is not limited to, a secondary amount associated with the transaction representing a cashback amount (AmountOther), Terminal Verification Results (TVR), currency code (CurrencyCode), date of the transaction (TransactionDate), type of the transaction (TransactionType), and a value to provide variability and uniqueness to the generation of a cryptogram (Unpredictable Number). The transaction data may include any other data part of the EMV (Europay Mastercard Visa) contactless specification.

At step s8, after the communication devices 120 reads the various transaction related dada from the peripheral device 140, the communication device 120 may send various transaction related data to the peripheral device 140, over the wireless BLE connection. The transaction related data can include, but is not limited to, data elements of track 2 according to ISO/IEC 7813 (e.g., PAN, expiration, etc.) (Track2EquivalentData), Application Interchange Profile (AIP), Application Transaction Counter (ATC), Issuer Application Data (IAD), and Authorization Request Cryptogram (ARQC). The transaction data may include any other data part of the EMV contactless specification. Some of the transaction data elements may be obtained by the communication device 120 from the cloud service or token service 110. For example, a payment token may be obtained (for every transaction, only once, or periodically) from the token service 110 instead of a PAN.

At step s9, after the communication device 120 sends various transaction related data to the peripheral device 140, the access device 130 (which is coupled to peripheral device 140) may forward the received transaction related data along with the final payment amount for the transaction to the issuer computer 650 for authorization. This may be sent in the form of an authorization request message. The data may be sent by the access device 130 over a traditional interconnected network, such as the Internet. For example, the access device 130 may send PaymentAmount, Track2EquivalentData, AIP, ATC, IAD, and ARQC to the issuer computer 650.

At step s10, after the access device 130 forwards the transaction related data along with the payment amount for the transaction to the issuer computer 650, the issuer computer 650 may transmit approval of the transaction (in the form of an authorization response message) along with an Authorization Response Cryptogram (ARPC) to the access device 130.

At step s11, after receiving the authorization response message along with the ARPC, the access device 130 may, via peripheral device 140, transmit the authorization response message and ARPC to the communication device 120 over the wireless BLE connection.

At step s12, after the communication device 120 receives the authorization response message along with the ARPC, the communication device 120 may terminate the BLE wireless connection with the peripheral device 140, as the transaction may be considered complete.

Figure 3:
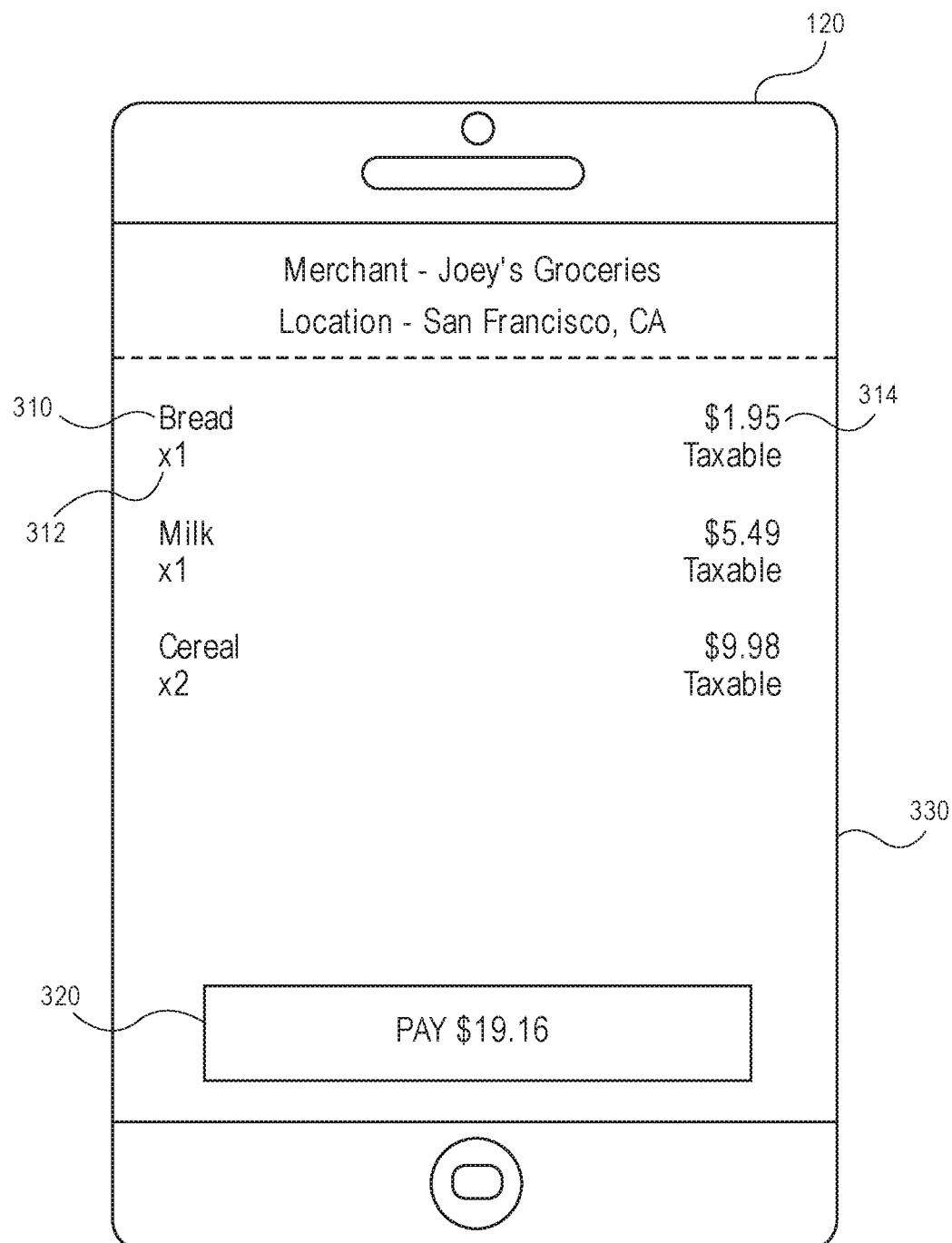
FIG. 3 shows line item data being presented on a communication device in real-time during a transaction, in accordance with some embodiments of the invention.

FIG. 3 shows line item data being presented on a communication device 120 in real-time during a transaction, in accordance with some embodiments of the invention. As described above, during a transaction, line item data can be transmitted from the peripheral device 140 to the communication device 120 in real-time as each item is scanned at the access device 130. The line item data can be transmitted over the established BLE wireless connection between the communication device 120 and the peripheral device 140. Upon receiving the line item data for a particular item, the communication device 120 can immediately display the line item data to the user via display device 330. The line item data can include, but is not limited to, item name 310, item quantity 312, and item price 314.

The list of items displayed on the display device 330 may be updated upon each scan of a subsequent item at the access device 130. For example, in the figure, line item data for "Bread", "Milk", and "Cereal" is provided. The quantity and price information for each item is provided, and the grand total for all the items scanned is displayed in a checkout button 320 within the user interface shown on the display device 330. In some implementations, an indicator or notification may be presented to the user that the total for the items has been calculated.

Once all items desired for the transaction have been scanned at the access device 130, the user may select the checkout button 320 to initiate payment for the scanned items. Upon selecting the checkout button 320 the communication device 120 may transmit payment data (described above) to the peripheral device 140 over the BLE wireless connection. Upon successful completion of the transaction, the display device 330 may display a receipt of the transaction for the user.

Figure 4:
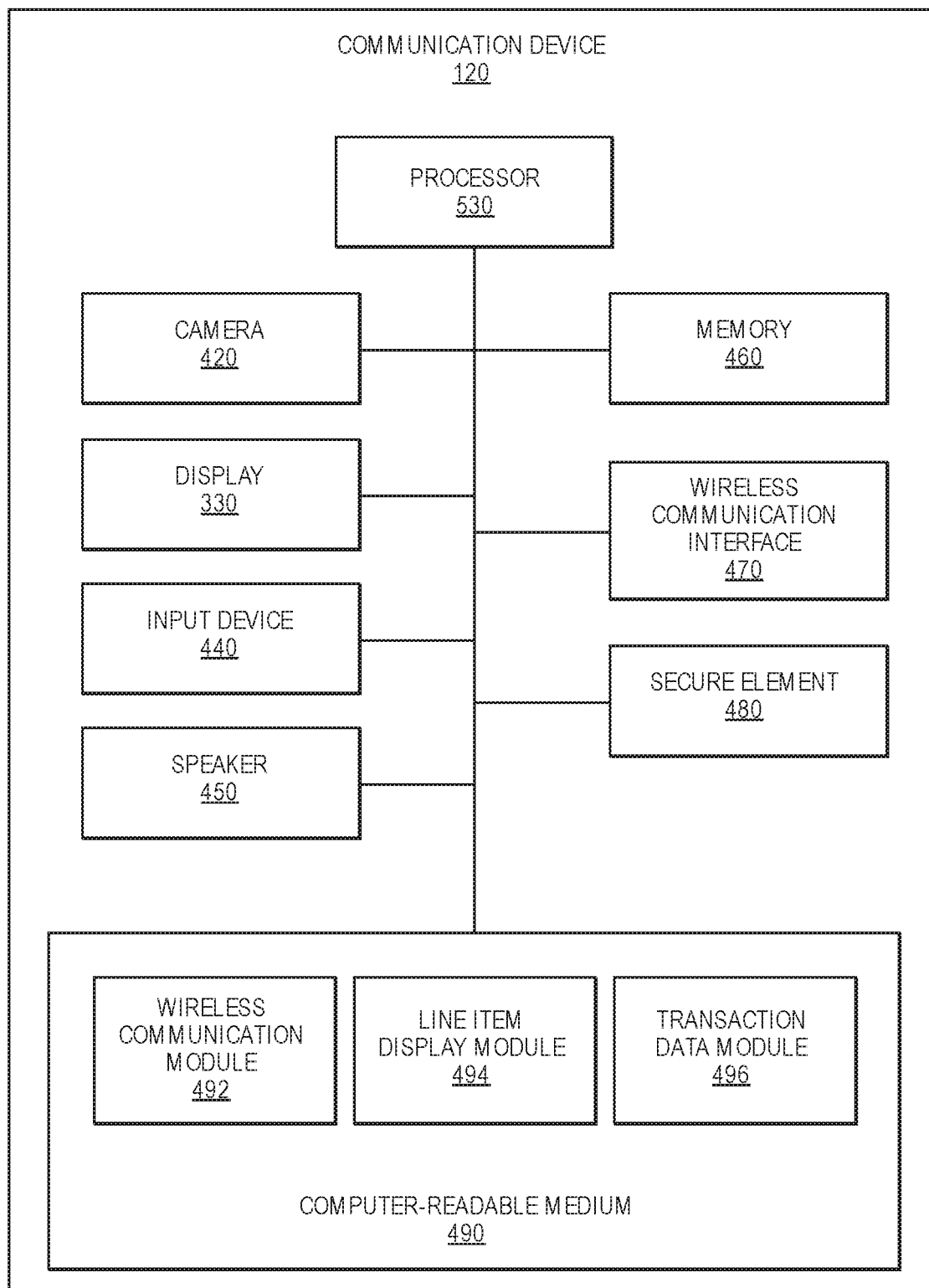
FIG. 4 shows a block diagram of a communication device, in accordance with some embodiments of the invention.

FIG. 4 shows a block diagram of a communication device 120, in accordance with some embodiments of the invention. Communication device 120 includes a processor 410, a camera 420, a display 330, an input device 440, a speaker 450, a memory 460, a Bluetooth interface 470, a secure element 480, and a computer-readable medium 490.

Processor 410 may be any suitable processor operable to carry out instructions on the communication device 120. The processor 410 may comprise a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Core, Atom, Celeron, Itanium, Pentium, Xeon, and/or XScale; and/or the like, processor(s). The processor 410 is coupled to other units of the communication device 120 including camera 420, display 330, input device 440, speaker 450, memory 460, and computer-readable medium 470.

Camera 420 may be configured to capture one or more images via a lens located on the body of communication device 120. The captured images may be still images or video images. The camera 420 may include a CMOS image sensor to capture the images.

Display 330 may be any device that displays information to a user. Examples may include an LCD screen, CRT monitor, or seven-segment display.

Input device 440 may be any device that accepts input from a user. Examples may include a keyboard, keypad, mouse, or microphone. In the case of a microphone, the microphone may be any device that converts sound to an electric signal. In some embodiments, the microphone may be used to capture one or more voice segments from a user for user authentication.

Speaker 450 may be any device that outputs sound to a user. Examples may include a built-in speaker or any other device that produces sound in response to an electrical audio signal.

Memory 460 may be any magnetic, electronic, or optical memory. It can be appreciated that memory 460 may include any number of memory modules. An example of memory 460 may be dynamic random access memory (DRAM).

Bluetooth interface 470 may be any interface or chipset that is operable for fundamental Bluetooth tasks, such as initiating device discovery, querying a list of bonded (paired) devices, instantiating a Bluetooth device using a known MAC address, creating a Bluetooth Server Socket to listen for connection requests from other devices, and start a scan for Bluetooth LE devices. The Bluetooth interface may transmit and receive Bluetooth wireless signals using an antenna built-in to the Bluetooth interface 470 or may interface with an Bluetooth antenna external (not shown) to the Bluetooth interface 470.

Secure element 480 can be a secure memory and execution environment. The secure element 480 may be a dynamic environment in which application code and application data can be securely stored and administered and in which secure execution of applications occur. The secure element 480 may reside in highly secure crypto chip (e.g., a smart card chip). The secure element 480 could be implemented either by a separate secure smart card chip, in the Subscriber Identity Module/Universal Integrated Circuit Card (SIM/UICC) (which is used by GSM mobile phone operators to authenticate subscribers on their networks and maintain personalized subscriber information and applications), or in an SD card that can be inserted in the communication device 120. In some embodiments, the payment information transmitted from the communication device 120 to the peripheral device 140 over the BLE wireless connection can be stored within the secure element 480. In some implementations, software-based host card emulation (HCE) may be used instead of a hardware-based secure element.

Computer-readable medium 490 may be any magnetic, electronic, optical, or other computer-readable storage medium. Computer-readable storage medium 490 includes Bluetooth module 492, line item display module 494, and transaction data module 496. Computer-readable storage medium 490 may comprise any combination of volatile and/or non-volatile memory such as, for example, buffer memory, RAM, DRAM, ROM, flash, or any other suitable memory device, alone or in combination with other data storage devices.

Wireless communication module 492 may comprise code, that when executed by processor 410, can cause the wireless communication interface 470 to perform various functions. For example, the wireless communication module 492 can instruct the wireless communication interface 470 to perform a scan for available peripheral devices 140 broadcasting a wireless communication signal (e.g., Bluetooth signal). The wireless communication module 492 can control various aspects of the wireless communication interface 470 hardware. In another example, the wireless communication module 492 may forward line item data received from peripheral device 140, via wireless communication interface 470, to the line item display module 494.

The line item display module 494 may comprise code, that when executed by processor 410, can cause the display 330 to display line item data received by communication device 120 via the wireless communication interface 470. The line item display module 494 may generate the user interface for displaying the line item data within the display 330.

Transaction data module 496 may comprise code, that when executed by processor 410, can cause the transaction data module 496 to transmit and receive transaction data, via wireless communication interface 470, to the peripheral device 140. The transaction data can include any data relevant to processing and authorizing the transaction. For example, the transaction data can include payment credentials associated with the user participating in the transaction.

Figure 5:
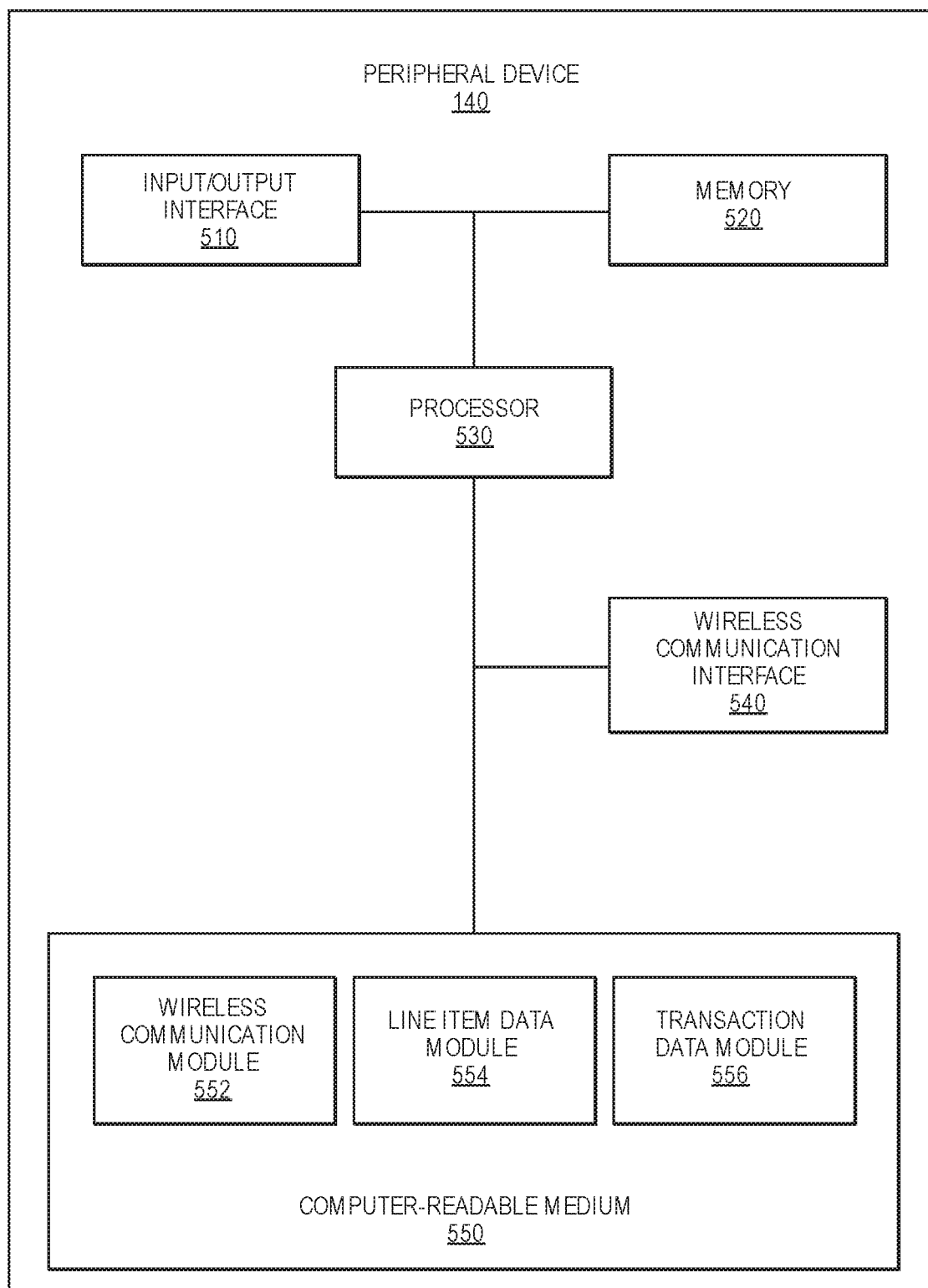
FIG. 5 shows a block diagram of a BLE peripheral device, in accordance with some embodiments of the invention.

FIG. 5 shows a block diagram of a wireless communication peripheral device 140, in accordance with some embodiments of the invention. Peripheral device 140 includes an input/output interface 510, a memory 520, a processor 530, Bluetooth interface 540, and a computer-readable medium 550. In some embodiments, the peripheral device 140 may be coupled to the access device 130.

The input/output (I/O) interface 510 is configured to receive and transmit data. For example, the I/O interface 510 may receive data transmitted over channels other than, for example, a BLE wireless connection. The I/O interface 510 may accept input from an input device such as, but not limited to, a keyboard, keypad, or mouse. Further, the I/O interface may display output on a display device.

Memory 520 may be any magnetic, electronic, or optical memory. It can be appreciated that memory 520 may include any number of memory modules. An example of memory 520 may be dynamic random access memory (DRAM).

Processor 530 may be any general-purpose processor operable to carry out instructions on the peripheral device 140. The processor 530 is coupled to other units of the peripheral device 140 including input/output interface 510, memory 520, Bluetooth interface 540, and computer-readable medium 550.

Computer-readable medium 550 may be any magnetic, electronic, optical, or other computer-readable storage medium. Computer-readable storage medium 550 includes Bluetooth module 552, line item data module 554, and transaction data module 556.

Wireless communication module 552 may comprise code, that when executed by processor 530, can cause the wireless communication interface 540 to perform various functions. For example, the wireless communication module 552 can instruct the wireless communication interface 540 to perform a broadcasting a wireless signal in order to "advertise" the peripheral device's 140 presence. The wireless communication module 552 can control various aspects of the wireless communication interface 540 hardware. In another example, the wireless communication module 552 may transmit, via Bluetooth interface 540, line item data received from the line item data module 554 to the communication device 120.

Transaction data module 556 may comprise code, that when executed by processor 530, can cause the wireless communication interface 540 to transmit and receive transaction data, via wireless communication interface 540, to the communication device 120. Additionally, the transaction data module 556 can cause the input/output interface to transmit the transaction data to the access device, which may then generate and send an authorization request to an issuer. The transaction data can include any data relevant to processing and authorizing the transaction. For example, the transaction data can include payment credentials associated with the user participating in the transaction.

Figure 6:
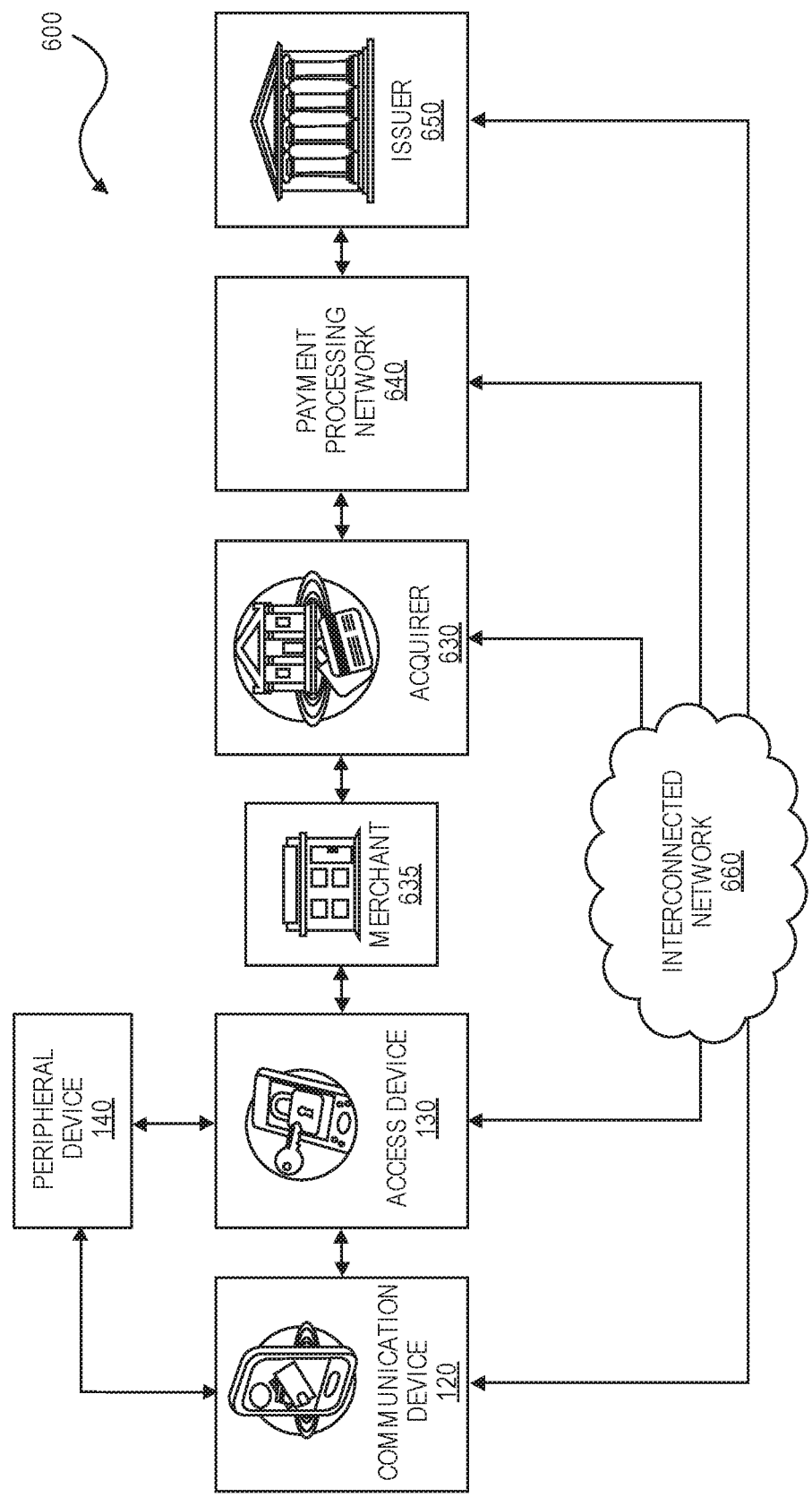
FIG. 6 shows a block diagram of an exemplary payment system, according to some embodiments of the invention.

FIG. 6 shows a block diagram of a more detailed view of a transaction processing system 600. The system 500 may include a communication device 120, an access device 130, a peripheral device 140, a merchant computer 635, an acquirer computer 630, a payment processing network computer 640, and an issuer computer 650. In some implementations, different entities in FIG. 6 may communicate with each other using one or more interconnected communication networks 660 such as the Internet, a cellular network, a TCP/IP network or any other suitable communication network. Note that one or more entities in the system 600 may be associated with a computer apparatus that may be implemented using some of the components as described with reference to FIGS. 4 and 5.

The communication device 120 may be associated with a payment account of a user. In some implementations, the communication device 120 may be a mobile device such as a mobile phone, a tablet, a PDA, a notebook, a key fob or any suitable mobile device. In some embodiments, the communication device 120 may be a wearable device such as, but not limited to, a smart watch, a fitness band, an ankle bracelet, a ring, earrings, etc. For example, the communication device 120 may include a virtual wallet or a payment application that may be associated with one or more payment accounts of the user. In some implementations, the communication device 120 may be capable of communicating with the access device 130 using a wireless data protocol such as Wi-Fi™ or Bluetooth™. For example, the communication device 120 may interact with the access device 130 by establishing a connection with the access device 130 using a wireless data protocol. As noted above, the communication device 120 may also communicate with a peripheral device 140 which may be coupled to the access device 130.

The access device 130 may be an access point to a transaction processing system that may comprise the acquirer computer 630, the payment processing network computer 640, and the issuer computer 650. In some implementations, the access device 130 may be associated with or operated by the merchant computer 635. For example, the access device 130 may be a point of sale device that may include a contactless reader, an electronic cash register, a display device, etc. In some implementations, the access device 130 may be configured to transmit information pertaining to one or more purchased items at a merchant 635 to an acquirer 630 or payment processing network 640. In some implementations, the access device 130 may be a personal computer that may be used by the user to initiate a transaction with the merchant computer 635 (e.g., an online transaction). In some implementations, the access device 130 may be configured to interface with a peripheral device 140 to communicate with a communication device 120 using a BLE wireless connection.

The acquirer computer 630 may be operated by an acquirer. The acquirer is typically a system for an entity (e.g., a bank) that has a business relationship with a particular merchant, a wallet provider or another entity. The acquirer computer 630 may be communicatively coupled to the merchant computer 635 and the payment processing network 640 and may issue and manage a financial account for the merchant. The acquirer computer 630 may be configured to route the authorization request for a transaction to the issuer computer 650 via the payment processing network computer 640 and route an authorization response received via the payment processing network computer 640 to the merchant computer 635.

The payment processing network computer 640 may be configured to provide authorization services, and clearing and settlement services for payment transactions. The payment processing network computer 640 may include data processing subsystems, wired or wireless networks, including the internet. An example of the payment processing network computer 640 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 640 may include a server computer. In some implementations, the payment processing network computer 640 may forward an authorization request received from the acquirer computer 630 to the issuer computer 650 via a communication channel. The payment processing network computer 640 may further forward an authorization response message received from the issuer computer 650 to the acquirer computer 630.

The issuer computer 650 may represent an account issuer and/or an issuer processor. Typically, the issuer computer 650 may be associated with a business entity (e.g., a bank) that may have issued an account and/or payment card (e.g., credit account, debit account, etc.) for payment transactions.

In some implementations, the business entity (bank) associated with the issuer computer 650 may also function as an acquirer (e.g., the acquirer computer 630).

As noted above, in some embodiments, the access device 130 may be coupled to a peripheral device 140 that provides BLE wireless connection functionality. The communication device 120 and access device 130 may communicate via a BLE wireless connection facilitated by the peripheral device 140. After transmitting and receiving various transaction related data between the communication device 120 and the peripheral device 140, the access device 130 may generate an authorization request message which may pass to the issuer 650 via the acquirer 630 and the payment processing network 640. The issuer 650 may then authorize the transaction, and may return an authorization response message back to the access device 130 via the payment processing network 640 and the acquirer 630. At the end of the day or any other suitable time period, a clearing and settlement process may take place.

The various participants and elements described herein with reference to FIGS. 1-6 may operate one or more computer apparatuses to facilitate the functions described herein. Any of the elements in FIGS. 1-6, including any servers or databases, may use any suitable number of subsystems to facilitate the functions described herein.

Figure 7:
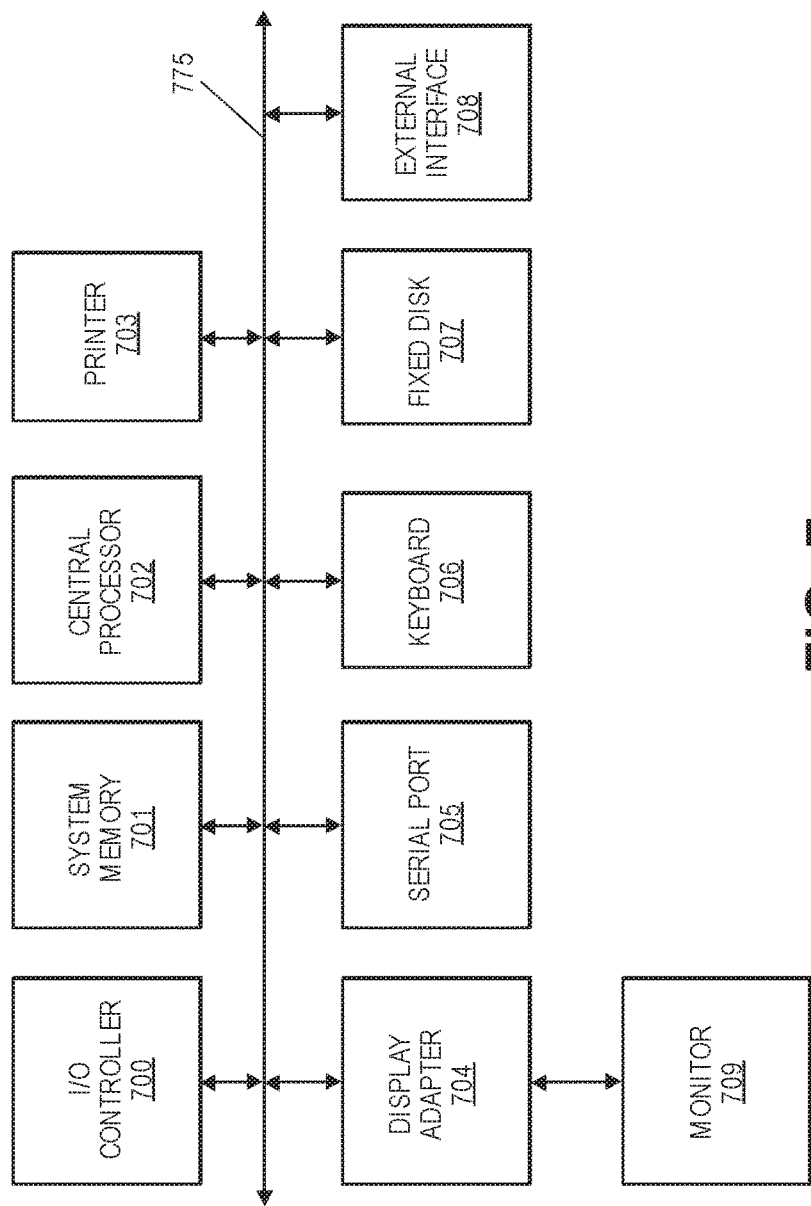
FIG. 7 shows exemplary computer apparatus, in accordance with some embodiments of the invention.

Examples of such subsystems or components are shown in FIG. 7. The subsystems shown in FIG. 7 are interconnected via a system bus 775. Additional subsystems such as a printer 703, keyboard 706, fixed disk 707 (or other memory comprising computer readable media), monitor 709, which is coupled to display adapter 704, and others are shown. Peripherals and input/output (I/O) devices, which couple to I/O controller 700 (which can be a processor or other suitable controller), can be connected to the computer system by any number of means known in the art, such as serial port 705. For example, serial port 705 or external interface 708 can be used to connect the computer apparatus to a wide area network such as the Internet, a mouse input device, or a scanner. The interconnection via system bus allows the central processor 702 to communicate with each subsystem and to control the execution of instructions from system memory 701 or the fixed disk 707, as well as the exchange of information between subsystems. The system memory 701 and/or the fixed disk 707 may embody a computer readable medium.

Embodiments of the invention provide a number of advantages. For example, in embodiments of the invention, a single connection session between a communication device and an access device, via a peripheral device, may allow the communication device to both receive information as a transaction is in progress and also transmit credential information to conduct a payment transaction. Conventionally, this process may involve multiple steps, however, embodiments of the invention make transaction processing at a point of sale much simpler and efficient.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While the above description discusses using BLE to facilitate a transaction, other medium-range wireless communication protocols may also be used. For example, Wi-Fi may be used to transfer transaction information between the communication device and the peripheral device. Additionally, a mix of different medium-range wireless communication protocols may also be used. For example, a mix of NFC and BLE may be used to transfer transaction information between the communication device and the peripheral device, where certain communications may be completed over NFC and certain communications may be completed over BLE.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for facilitating a transaction, comprising:
    identifying, by a communication device via a wireless short-range communication channel, a number of available peripheral devices within a communication range of the wireless short-range communication channel, each of the number of available peripheral devices linked to a different point-of-sale device and continuously advertising its presence, wherein the communication device is a mobile device that is executing a payment application and comprises a secure element storing payment data and wherein the point of sale device is located within a merchant store;
    displaying, by the communication device, the available peripheral devices on a display of the communication device;
    receiving, by the communication device, a selection of a peripheral device associated with a point-of-sale device from the number of available peripheral devices;
    launching, by the communication device, the payment application;
    establishing, by the communication device, a wireless short-range communication link with the peripheral device, wherein the wireless communication link is secure and encrypted;
    receiving in real-time, by the communication device from the peripheral device via the wireless short-range communication link, item level data associated with an item for purchase as the item for purchase is being scanned by the point of sale device;
    displaying, on the display of the communication device, the item level data associated with the item for purchase;
    displaying, on the display of the communication device, a notification to complete the transaction;
    receiving, by the communication device, authorization to complete the transaction and provide the payment data to the point of sale device;
    transmitting, via the payment application that is executing on the communication device, the payment data stored at the secure element to the point of sale device; and
    displaying, on the display of the communication device, a receipt associated with the transaction.

2. The method of claim 1, wherein the wireless-short range communication link is a Bluetooth low energy (BLE) communication link.

3. The method of claim 2, wherein the peripheral device is a BLE enabled device.

4. The method of claim 1, wherein the point of sale device processes the transaction based at least in part on the transmitted payment data.

5. The method of claim 1, further comprising:
    receiving, via the communication device and from the peripheral device, item level data associated with a second item being processed by the point of sale device; and
    displaying, on the display, the item level data associated with the second item.

6. The method of claim 1, further comprising:
    terminating, a connection with the peripheral device after transmitting the payment data to the point of sale device.

7. The method of claim 1, wherein the payment data comprises a payment credential, the payment credential being stored on the secure element.

8. The method of claim 1, further comprising:
    receiving, by the communication device from the peripheral device, an amount for the item for purchase via the wireless short-range communication link.

9. The method of claim 1, wherein receiving, by the communication device from the peripheral device via the wireless short-range communication link, item level data associated with the item for purchase as the item for purchase is being scanned by the point of sale device comprises receiving, by the communication device from the peripheral device via the wireless short-range communication link, item level data associated with a plurality of items for purchase as the plurality of items for purchase are being scanned by the point of sale device, the plurality of items including the item.

10. A method for facilitating a transaction, comprising:
    continuously advertising, by a peripheral device linked to a point-of-sale device, an availability of the peripheral device, wherein the point of sale device is located within a merchant store;
    receiving, by the peripheral device, a communication from a communication device via a wireless short-range communication channel, wherein the communication device is a mobile device that is executing a payment application and comprises a secure element storing payment data;
    establishing, via the peripheral device, a wireless-short range communication link to the communication device, wherein the wireless communication link is secure and encrypted;
    transmitting in real-time, by the peripheral device and to the communication device via the wireless-short range communication link, item level data associated with an item for purchase that is being scanned by the point of sale device, wherein the communication device is caused to display the item level data associated with the item for purchase as the item for purchase is being scanned;

receiving, by the peripheral device and from the payment application executing on the communication device, the payment data stored on the secure element of the communication device;

generating, by the peripheral device, a receipt of the transaction; and transmitting, by the peripheral device to the communication device, the receipt.

11. The method of claim 10, wherein the wireless-short range communication link is a Bluetooth low energy (BLE) communication link.

12. The method of claim 10, wherein the peripheral device is a BLE enabled device.

13. The method of claim 10, wherein the point of sale device processes the transaction based at least in part on the transmitted payment data.

14. The method of claim 10, further comprising:

transmitting, by the peripheral device and to the communication device, item level data associated with a second item being processed by the point of sale device, wherein the communication device displays the item level data associated with the second item.

15. A peripheral device linked to a point-of-sale device, the peripheral device comprising:

a processor; and a computer readable medium, the computer readable medium comprising code, executable by the processor for implementing a method comprising:

continuously advertising an availability of the peripheral device, wherein the point of sale device is located within a merchant store;

receiving a communication from a communication device via a wireless short-range communication channel within a communication range of the wireless short-range communication channel, wherein the communication device is a mobile device that is executing a payment application and comprises a secure element storing payment data;

establishing a wireless-short range communication link to the communication device, wherein the wireless communication link is secure and encrypted;

transmitting in real-time, to the communication device via the wireless-short range communication link, item level data associated with an item for purchase that is being scanned by the point of sale device, wherein the communication device is caused to display the item level data associated with the item for purchase as the item for purchase is being scanned;

receiving, from the payment application executing on the communication device, the payment data stored on the secure element of the communication device;

generating a receipt of the transaction; and transmitting, to the communication device, the receipt.

16. The peripheral device of claim 15, wherein the payment data comprises a payment token.

17. The peripheral device of claim 15, wherein the item level data comprises a quantity and price.

18. The peripheral device of claim 15, wherein the peripheral device comprises a wireless communication interface.

19. The peripheral device of claim 18, wherein the communication device is a mobile phone.

20. The method of claim 1, further comprising:

prior to identifying the number of available peripheral devices:

scanning, by the communication device, one or more wireless short-range communication channels for available peripheral devices.

* * * * *